(12) United States Patent
Fraley et al.

(10) Patent No.: US 6,304,918 B1
(45) Date of Patent: Oct. 16, 2001

(54) OBJECT INTERFACE CONTROL SYSTEM

(75) Inventors: Christopher Lee Fraley, Woodinville; Christopher Alan Zimmerman, Bellevue, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/815,495

(22) Filed: Mar. 11, 1997

(51) Int. Cl.⁷ ........................................ G06F 9/30
(52) U.S. Cl. ............................ 709/322; 709/315
(58) Field of Search ..................... 395/680–685; 709/300–305, 310–332; 700/100, 102, 103, 105, 108

(56) References Cited

U.S. PATENT DOCUMENTS

| | | | |
|---|---|---|---|
| 5,511,197 | * | 4/1996 | Hill et al. ............................. 709/300 |
| 5,613,124 | * | 3/1997 | Atkinson et al. ..................... 395/133 |
| 5,710,925 | * | 1/1998 | Leach et al. ......................... 709/303 |

OTHER PUBLICATIONS

Microsoft Corporation & Digital Equipment Corporation; Component Object Model Specification, Part 1: Component Object Model Introduction Version 0.9, Oct. 24, 1995.*

Microsoft, The Component Object Model: Technical Overview, Oct. 1994.*

Microsoft, "The Component Object model Specification", pp. 1–274, Oct. 1995.*

Kraig Brockschmidt, Inside OLE2, pp. 101–106, 1994.*

* cited by examiner

Primary Examiner—Majid Banankhah
(74) Attorney, Agent, or Firm—Leydig, Voit & Mayer, Ltd.

(57) ABSTRACT

An object interface control system that provides a mechanism for identifying the functionality available at an interface separately from the interface itself. A COM implementation provides a new function call named QueryService which is similar to the existing QueryInterface function call. Services are defined which include a set of functionality. The set of functionality for a service is expressed through a family of interfaces. When requesting a pointer to a function using the QueryService call, one specifies the service name and the interface name. Different services may utilize the same interface. Different services may utilize the same interface through which each service provides different functionality. A QueryService function call may return a pointer to an interface on the same object to which the call was placed or it may return a pointer to an interface on a different object. Object identity is not assumed with the QueryService function call and hence queries for services can be easily delegated.

25 Claims, 9 Drawing Sheets

OBJECT INTERFACE CONTROL SYSTEM

FIELD OF THE INVENTION

This invention relates to the field of object oriented programming languages. In particular, this invention relates to objects based on the Component Object Model ("COM"). The invention provides a means for determining the form of an object's interface as well as the functionality of an object's interface by defining services within which are grouped methods.

PROBLEM

Object-oriented programming or development has become the standard by which most commercial software is developed. By this technique, a method is implemented as an object by bundling together both the data and the procedural code that manipulates the data. Multiple objects interact with one another through their respective interfaces which expose functionality. Objects are classically defined by three characteristics: encapsulation, polymorphism and inheritance. Encapsulation means that only the interface of an object is visible to other objects and the underlying implementation of the object is encapsulated within the object. Polymorphism is the ability for different objects to behave differently to the same message. For example, the "DRAW" command to an object that makes triangles provides a different result than the "DRAW" common to an object that makes circles but the command used with both objects is the same. The triangle object and the circle object are polymorphic through a "shape" interface. Inheritance is an abstraction that allows the similarities of different classes to be described by a common base class.

The Component Object Model ("COM") is one model that defines an architecture for building objects and, in particular, defines the polymorphism between objects. COM is currently used extensively and its details are well known to those skilled in the art. COM also forms a constituent portion of the Object Linking and Embedding ("OLE") environment of object-based services. OLE's framework and flexibility is also well understood by those skilled in the art. Currently COM provides for certain communications and operations between objects and objects used in a COM environment must conform to the COM definitions and rules.

The QueryInterface call is the primary mechanism provided by COM for determining which features an object supports. The functionality an object implements is accessed via one or more interfaces designed to expose that functionality. QueryInterface is used to determine what interfaces and hence what functionality an object supports. QueryInterface also must be used to get a pointer to call through an interface even if it is known that the object supports the needed interface. QueryInterface is the only way to get the necessary pointer to an interface for an object. To use the QueryInterface call, a client object passes an Interface ID ("IID") parameter identifying the requested interface to the server object. If the server object supports the interface, a pointer to that interface on the server object is returned to the client object. An important characteristic of the QueryInterface call is that, by definition, QueryInterface requires object identity. Object identity means that a pointer returned by a server object in response to a QueryInterface call will always be a pointer to an interface of the server object. QueryInterface does not allow the return of a pointer to an interface of a different object.

A problem occurs when there are collisions in the naming of object interfaces. Through independent development of COM objects or as COM or COM-based systems have developed over time, situations can arise where an IID passed in a QueryInterface call conflicts with an IID implemented on the server object and that IID provides a different functionality than expected. In these situations, one must use a different IID in order to distinguish between the different functionalities. For example, a development of COM, called OLE Controls, that was implemented subsequent to the original COM design, added new functionality including a feature known as ambient properties. This functionality was accessed via the IDispatch interface, a generic, polymorphic way to access properties of an object. A container object, such as for a document, has multiple control objects with which it is associated. The container object can have ambient properties, margin settings for example, that each of the control objects needs to be aware of. OLE Controls adopted a convention by which a control object can ascertain the ambient properties of the container object by making an IDispatch call on the container. A QueryInterface call is first made on the container object to get a pointer to the IDispatch interface. Due to independent development of COM containers prior to the standardization of OLE Controls, the IDispatch name had been used by some containers to access a different set of properties and this previously implemented IDispatch interface has nothing to do with ambient properties. The use of the IDispatch IID by two interfaces providing different functionalities conflicts with their desire to expose this functionality in a standard way.

A QueryInterface call does not allow a client object to identify the functionality of the request (e.g. ambient properties) separate from the form, (e.g. IDispatch) that the functionality assumes on the server object. The only guaranteed approach to circumventing the above problem is to always ensure that a new IID is used. This approach is effective but limits the advantages of polymorphism and the reuse of code. Another existing approach is to explicitly design the required functionality into the communication between the client object and the server object. A further solution is where the client object has enough knowledge about the server object to explicitly navigate to the required functionality.

There exists a need for an object interface control system that allows a client object to access more than one functionality through a single interface of a server object without the need to create different interfaces on the server object. There exists a further need to identify both the form of an interface as well as the context in which the interface exists. A further need exists for an object interface control system that provides an QueryInterface-like call without the limitation of object identity.

SOLUTION

The above identified problems, and others, are solved and a technical advance achieved in the field by the object interface control system of the present invention. The present invention provides a method and apparatus for reusing an interface of an object for multiple purposes while maintaining the required characteristics of polymorphism. In general, the present invention provides a QueryInterface-like call that allows the client object to indicate the desired interface and, in addition, to indicate the context in which the call is made. This mechanism returns an object which implements the requested functionality expressed in terms of the desired interface. In effect, the present invention allows a client object to identify the functionality of a call to a server object separate from the form, i.e. the interface, that the functionality is to assume. A result is that a single interface can be reused for multiple purposes by identifying the context of the request. A further result is that object identity does not apply to the function call provided by the present invention. Therefore, the interface returned by the server object may or may not be on the server object itself.

The present invention provides a mechanism for a client object to query a server object to determine if an object, the server object or a different object, supports a particular feature or functionality and where to find the proper interface from which to access the feature. This is similar to the IUnknown interface and the QueryInterface call of COM. However, the QueryInterface call requires that the client object pass only an IID to the IUnknown interface. The IID defines both the functionality or feature of interest and the form or interface at which that function or feature is to be accessed by the client object. Every functionality or feature must be accessed through a different interface having a unique IID. The object interface control system of the present invention, in its COM embodiment, provides an interface named IServiceProvider and a call to that interface defined as QueryService. A client uses a QueryService call by passing an IID and a Service Identifier ("SID") to the IServiceProvider interface of a server object. The SID identifies a unique set of functionality to which the caller wants to gain access. The unique set of functionality is expressed through a group of interfaces or a service interface family. The IID is one interface of the set of interfaces defined in the description of the service. According to the methods of the present invention the server object returns an object to the caller which supports the set of interfaces defined by the service.

There are two primary advantages of the QueryService call of the present invention. First, a single interface having a single IID can be reused for different purposes. For example, two services can be defined wherein the service definitions include, among additional interfaces, one interface in common. Within the context of one service, a certain feature is available at the common interface while in the context of the other service a different feature is available at the common interface. Thus the same interface is reused for different purposes while maintaining the polymorphism of the objects. The other advantage of the QueryService call is that object identity is not enforced with respect to the mechanism of the present invention. This means that the object returned in the form of a pointer from the server object to the client object might be but might not be the server object itself. The object providing the set of functionality defined as the service is called the service object. The service object can be the same as the server object or it can be a different object. The service definition can include features accessible at different objects. The caller or client object does not know or care at which object the requested feature is accessed. The caller simply receives a pointer from the server object which is used by the caller to access the requested feature or function.

The object interface control system of the present invention allows the caller or user of a functionality to separate the functionality from the form of a particular feature when requesting access to the feature. In addition, object identity is not assumed therefore implementation of service features can be placed with more flexibility.

DETAILED DESCRIPTION

Figure 1:
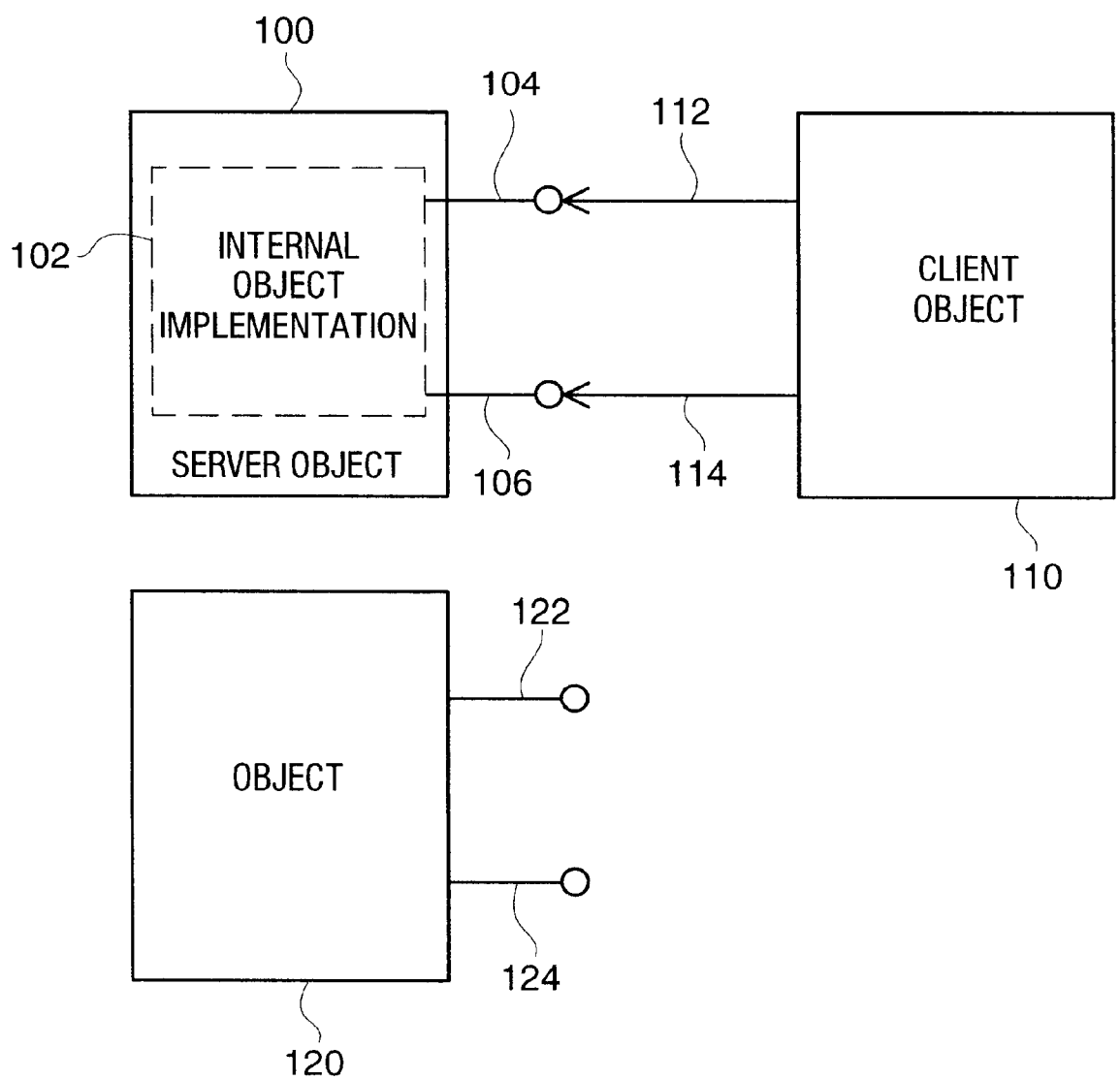
FIG. 1 is a block diagram illustrating object communication of the Prior Art.

Object Communication In General—FIG. 1 (Prior Art)

FIG. 1 is a block diagram illustrating a server object 100 which encapsulates an implementation 102. The block diagram of FIG. 1 utilizes a pictorial format that is used in the remaining FIGS. 2–10. Blocks, such as server object 100 and client object 110, represent an object. Interfaces, such as interfaces 104 and 106, are represented as jacks to which one "plugs" into the functionality of an object. Arrows, such as pointer 112, represent pointers used by one object to call a function at another object. As explained below, a pointer "points" to an interface. Implementation 102 is expressed to other objects through interfaces 104 and 106. Interfaces 104 and 106 represent different ways of accessing the functionality created by implementation 102. There may be any number of interfaces defined for an object. Client object 110 can only communicate with server object 100 through the interfaces of server object 100. Client object 110 can only communicate with the interfaces of server object 100 when client object 110 has a pointer to one of the interfaces of server object 100. Once client object 110 has a pointer to one of the interfaces of server object 100, the client object can, as described below, navigate through the other interfaces of server object 100 using the QueryInterface function call or method. Pointers 112 and 114 represent pointers to the different interfaces of server object 100.

The QueryInterface call of the Component Object Model ("COM") is used as follows. Assume client object 110 has pointer 112 to interface 104 but does not have pointer 114 to interface 106. For purposes of this example assume that Feature A, part of the functionality provided by implementation 102. is available at interface 104 and Feature B. a different piece of the functionality provided by implementation 102, is available at interface 106. Client 110 needs to utilize Feature B at interface 106 and therefore needs to obtain a pointer to interface 106. Client object 110 uses the QueryInterface method to obtain the necessary pointer.

To use the QueryInterface method, client object 110 passes to server object 100 the Interface Identifier ("IID") for the requested interface and an out-parameter using the known interface pointer. If the IID is supported by the server object then a new interface pointer is returned in the out-parameter for the requested interface. The generic form of the QueryInterface call is provided in psuedocode as follows:

pointer →QueryInterface(IID, Out-Parameter)

In the current example, client object 110 has pointer 112 which is the pointer to interface 104 of server object 100. Client object makes a QueryInterface call on interface 104 using pointer 112 and passes, as the QueryInterface parameters, the IID for interface 106 and an out-parameter for the pointer to interface 106. If server object 100 supports the feature identified by the IID passed in the QueryInterface call, which it does in this example, then a new pointer, pointer 114 is returned to client object 110. Client object then accesses interface 106 using pointer 114. The QueryInterface mechanism is the only means by which a client object can get pointers to the interfaces of a server object.

Interface 104 and interface 106 must have different IID's. Consider the example where Feature B available at interface 106 has all of the same methods of Feature A available at interface 104 but the actual functionality of Features A and B differs. Both have the same methods, e.g. IPersistStream, but Feature A saves binary data to the stream, while Feature B saves ASCII data to the stream. Ideally one would like to use a single name for the expression of Features A and B (i.e. the "form"), since the methods are identical, but have the pointer to the proper Feature returned to a client object depending on which Feature that the client object requests. In this way, a single ID would be utilized for both versions of the feature and client object code is more easily reused. This would allow the form (i.e., the expression of the feature, the interface name) to be re-used even though the functionality differs between the two Features. This is not possible with the QueryInterface function but is possible, as described below, according to the methods of the present invention.

Object 120 is utilized to illustrate the principle of object identity. Object 120 has interfaces 122 and 124 which represent different features available at object 120. Interfaces 122 and 124 of object 120 each have a unique IID. When client object 110 QueryInterface's server object 100 and passes the IID of interface 122 for example, the QueryInterface function call fails. One cannot successfully QueryInterface an object with the IID of an interface that is not present on the object. QueryInterface is only used to navigate the available interfaces of the object to which the QueryInterface call is directed. The methods of the present invention, as described below, do not assume object identity.

Figure 2:
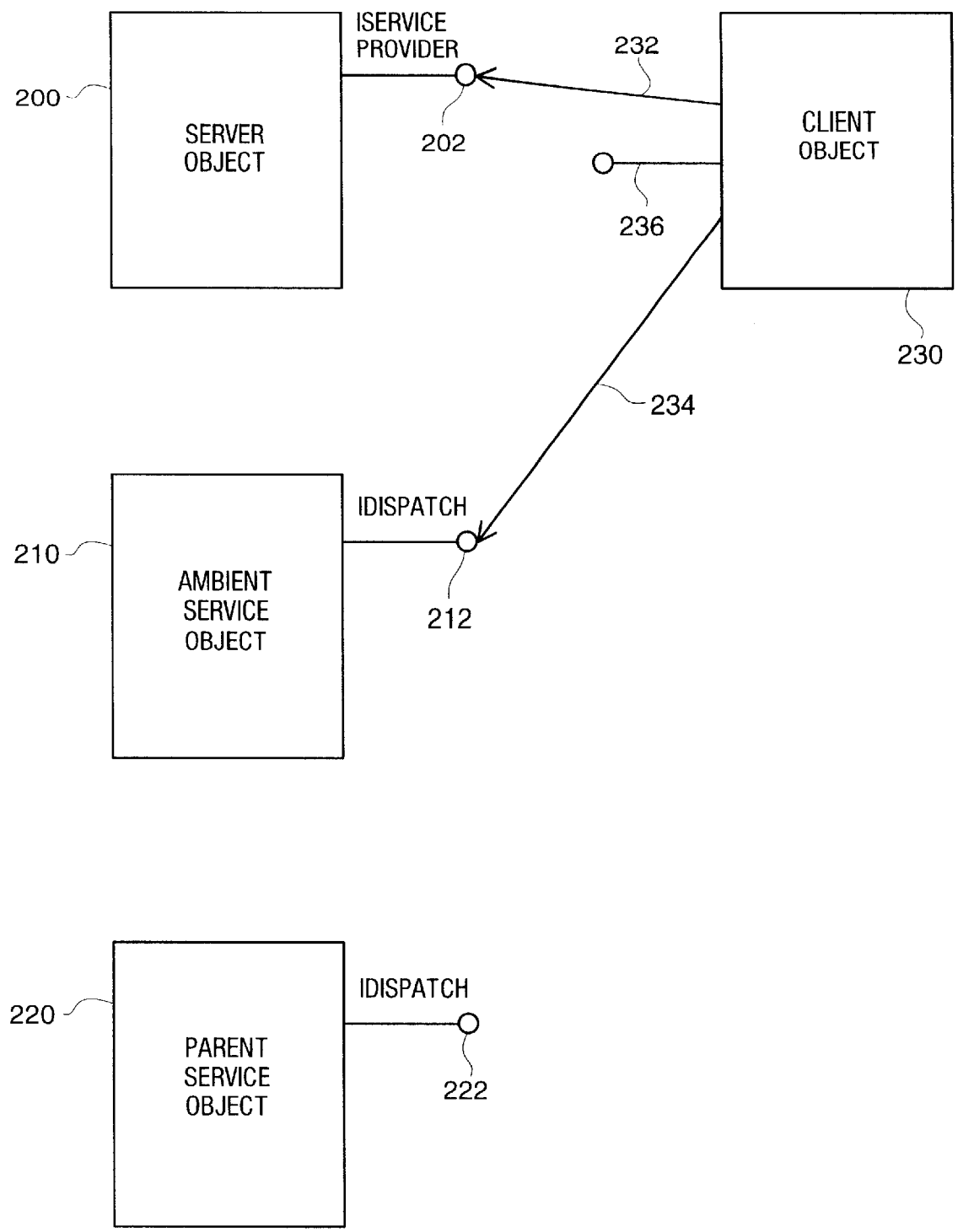
FIG. 2 is a block diagram illustrating the object interface control system according to the methods of the present invention.
Figure 3:
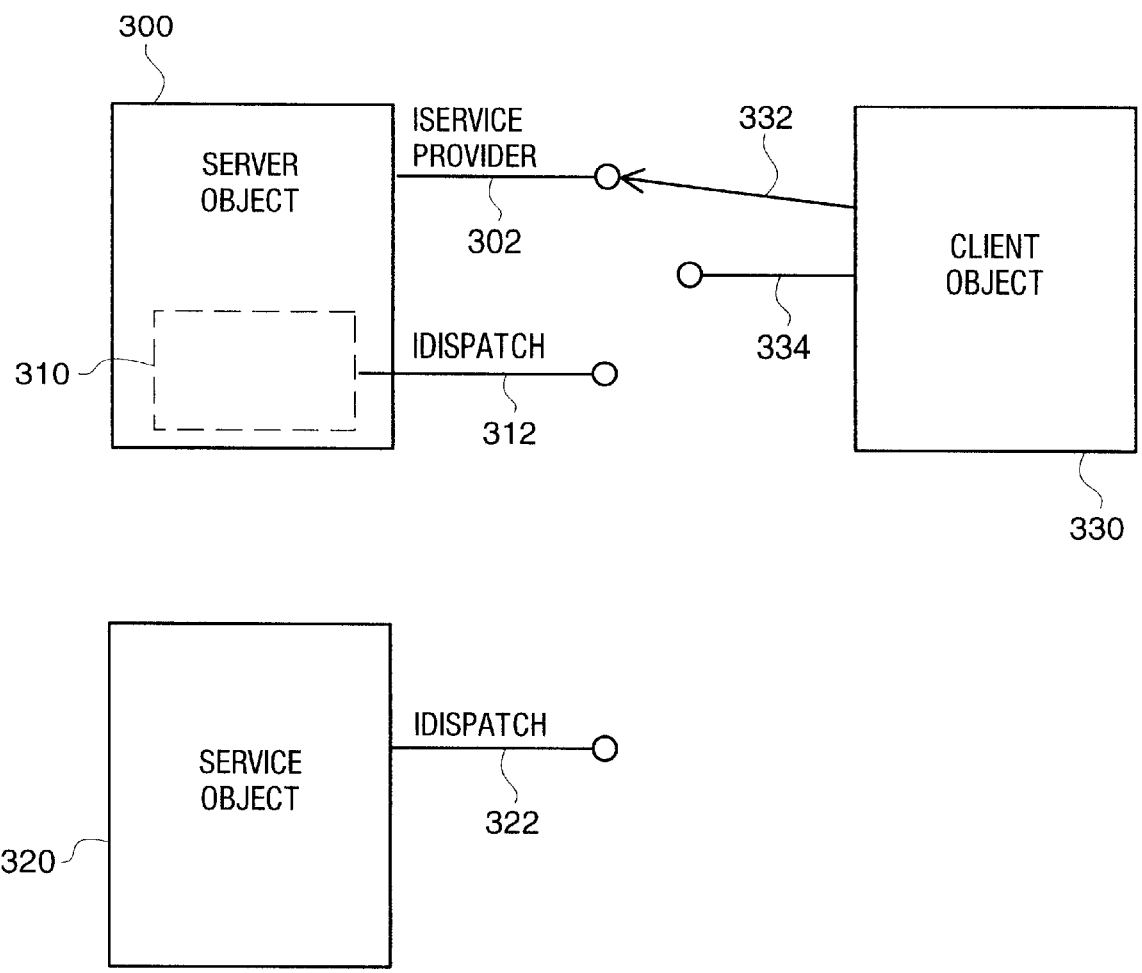
FIG. 3 is a block diagram illustrating an implementation of the object interface control system according to the methods of the present invention.

IServiceProvider In General—FIG. 2–3

The interface and function call provided by the present invention is similar to, but has advantages over, the operation of the QueryInterface function described above. In its COM implementation, the interface of the present invention is named "IServiceProvider" and the related function call is named "QueryService". To utilize the QueryService function one or more services are defined. Each service is identified by a Service Identifier ("SID"). Each SID is, like each IID, a Globally Unique Identifier ("GUID"). GUID's are 128 bit numbers formed according to known methodology and each GUID is, as its name suggests, a unique number.

Each SID identifies a set of functionality and the interfaces used to access this functionality. This set of functionality is referred to herein as a service or a service's respective set of functionality or a service interface family. When a client object uses QueryService, it passes both a SID and an IID to a server object as parameters of the QueryService function call. In response to a QueryService call, a pointer is returned to the client object. The returned pointer is used by the client object to access the interface having the IID passed in the QueryService function call. Table 1 illustrates exemplary definitions of two services.

TABLE 1

| Ambient Service | SID_SAmbient | Access to the ambient property functionality. |
|---|---|---|
| | IID_IDispatch | The interface used to gain access to the ambient properties. |
| Parent Service | SID_SParent | Returns the logical "Parent" of a sited object. |
| | IID_IDispatch | The programmability interface of the Parent object. |

Ambient Service provides access to the ambient property functionality and has a SID of SID_SAmbient. The interface making up the Ambient Service is IDispatch having an IID of IID_IDispatch. IDispatch is the interface used to gain access to the ambient properties. The interface making up the Parent Service is also IDispatch. The IDispatch interface of the Parent Service is the programmability interface of the Parent object. The IDispatch interface of the Parent Service provides different functionality than the IDispatch interface of the Ambient Service. The actual functionality available at these exemplary interfaces is not pertinent to, or part of, the present invention.

Without the QueryService function, one would have to rename one of the interfaces of the above example in order to avoid a conflict or indeterminate situation from a use of the QueryInterface call. However, QueryService allows the client object to distinguish between the functionality requested and the form that functionality is to take. In both uses of the IDispatch interface in the above example, the form the functionality is to take is the IDispatch interface. However, the SID allows the client object to choose between functionality at IDispatch for accessing ambient properties or functionality at IDispatch for accessing the programmability interface of a Parent object.

FIG. 2 is a block diagram illustrating an implementation of the exemplary services defined in Table 1. Server Object 200 has IServiceProvider interface 202. Ambient Service object 210 has IDispatch interface 212 and Parent Service object has IDispatch interface 222. Client object 230 calls the QueryService function at IServiceProvider interface 202 of Server object 200 using pointer 232. Communications to client object 230 are received at interface 236. The pointer→QueryService(SID, IID, Out-Parameter)

Thus if client object 230 wants to access the ambient properties functionality, for example, a QueryService function call is made as follows.

pointer→QueryService(SID_SAmbient, IID_IDispatch, pIDisptach)

This identifies the Ambient Service which is implemented on Ambient Service Object 210 and the IDispatch interface 212 of the Ambient Service. Pointer 234, returned as the out-parameter pIDispatch, is returned to client object 230 so that client object 230 can call the functionality available at IDispatch interface 212. The actual effect of the QueryService call is to return a pointer that has already been QueryInterface'd to the requested IID of the requested service.

In this example, the Ambient Service and the Parent Service must be implemented on different objects because the functionality available at IDispatch interface 212 differs from the functionality available at IDispatch interface 222. The IID used in the QueryService function call is the same for both interfaces but the SID serves to differentiate between IDispatch interface 212 and IDispatch interface 222. The example of Table 1 and FIG. 2 illustrate the reuse of an interface name, i.e. IDispatch, and the lack of object identity of the QueryService function call. The pointer returned to client object 230 is, in the example of FIG. 2, not a pointer to an interface on server object 200.

FIG. 3 illustrates an alternate implementation of the services defined in Table 1. Server object 300 includes IServiceProvider interface 302 and IDispatch interface 312. IDispatch interface 312 is an interface of the Ambient Service implementation 310 which, in this embodiment, is implemented on server object 300 rather than on a separate object as in FIG. 2. The Parent Service is still implemented separately on parent service object 320. Parent service object 320 has IDispatch interface 322 at which is available the programmability interface of parent object. When client object 330, using pointer 332, calls the QueryService unction at IServiceProvider interface 302. a pointer to server object 300 or a pointer to parent service object 320 is returned, depending on which service is identified in the QueryService call. This again ensures that there is no conflict between the differing functionality of the IDispatch interface of the Ambient Service and the IDispatch interface of the Parent Service. Communications to client object 330 are received at interface 334.

Figure 4:
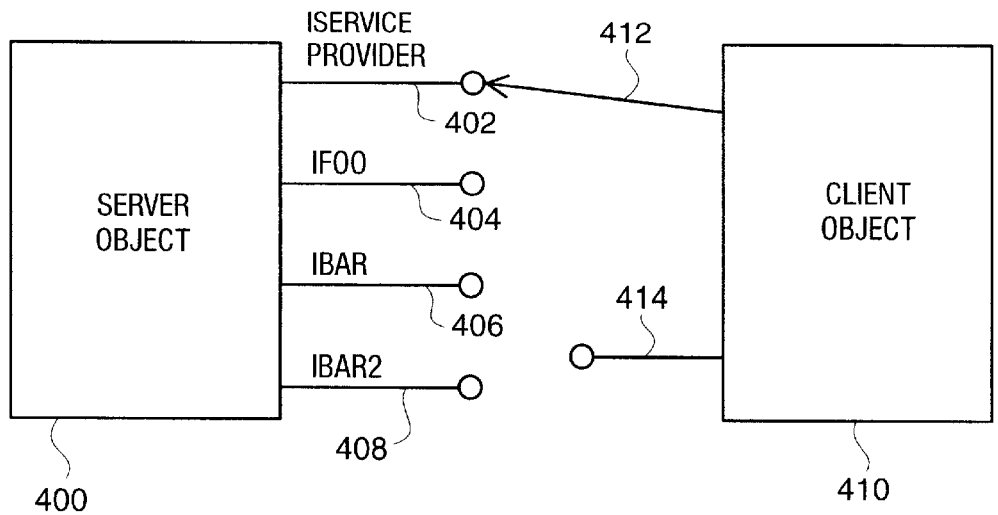
FIG. 4 is a block diagram illustrating a further implementation of the object interface control system according to the methods of the present invention.
Figure 5:
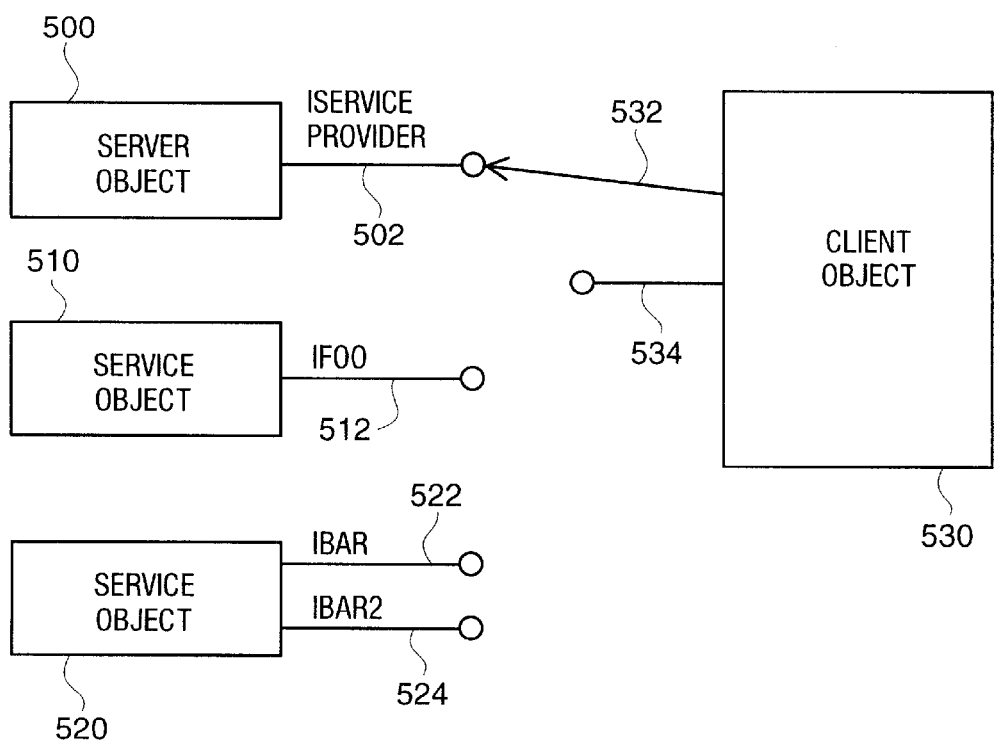
FIG. 5 is a block diagram illustrating an implementation of the object interface control system according to the methods of the present invention.
Figure 6:
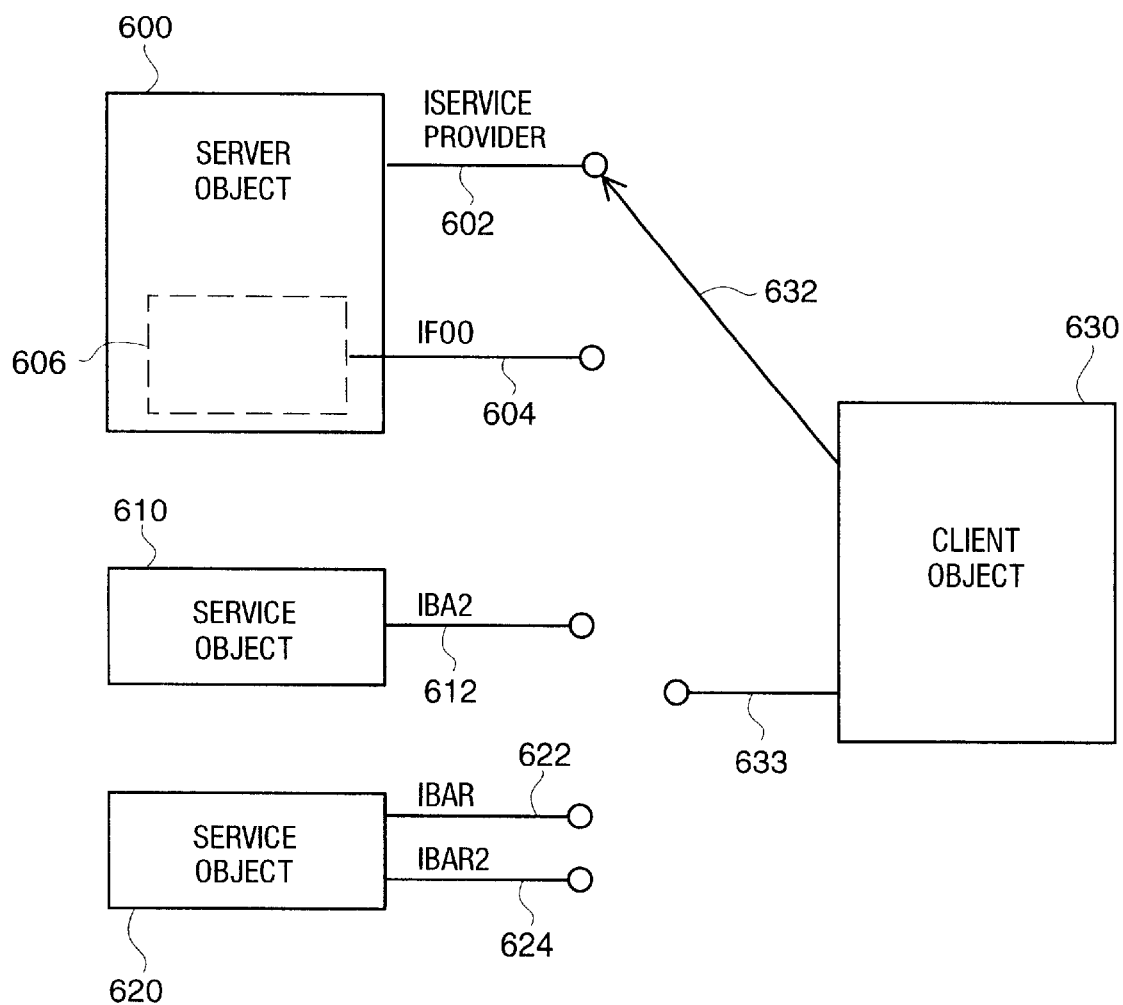
FIG. 6 is a block diagram illustrating an implementation of the object interface control system according to the methods of the present invention.

IServiceProvider Implementation—FIGS. 4–6

Table 2 below illustrates exemplary definitions of three hypothetical services which are used with reference to FIGS. 4–6 to explain further features and issues relating to implementation of the present invention.

TABLE 2

| Foo Service | SID_SFoo | | Access to the Foo functionality. |
|---|---|---|---|
| | IID_Dispatch | Optional | Ambient property functionality. |
| | IID_IFoo | Required | The Foo functionality. |
| Bar Service | SID_SBar | | Access to the Bar functionality. |
| | IID_IBar | Required | The Bar functionality. |
| Bar2 Service | SID_SBar2 | | Access to the Bar2 functionality. |
| | IID_IBar | Required | The original Bar functionality. Same as SID_Bar's IID_Bar. |
| | IID_IBar2 | Required | The Bar2 functionality. |

Table 2 indicates the service names, SID's, IIID's and service/interface descriptions for the hypothetical services named Foo Service, Bar Service and Bar2 Service. In addition, Table 2 indicates whether each of the interfaces making up the three services is required for that service or is merely optional. A required interface is one which must be provided on the object on which the service is implemented. An optional interface is one which can be, but doesn't have to be, implemented on the object on which the service is implemented. For example. the IDispatch interface of Foo Service is optional. This means that on any object on which the Foo Service is implemented, the IDispatch interface may or may not be included.

The exemplary services defined in Table 2 each have multiple interfaces. A multitude of implementation choices exist when there are several different services each having multiple interfaces, as in this example. FIGS. 4–6 illustrate 3 different implementations of the three services defined in Table 2. Each implementation of FIGS. 4–6 demonstrates further advantages of the present invention and raises unique implementation issues.

FIG. 4 illustrates an implementation of the services defined in Table 2 where all three services are implemented on one object, server object 400. Only one interface, IBar, is in common between any of the services and IBar provides the same functionality as part of Bar Service as it does as part of Bar2 Service. It is therefore possible to implement all three interfaces on the same object. If there is no overlap in the use of definition of interfaces for multiple services or if any overlap is not conflicting, as in the example of FIG. 4, then multiple interfaces can be implemented on one object.

The interfaces of server object 400 include IServiceProvider interface 402. IFoo interface 404, IBar interface 406 and IBar2 interface 408. The optional interface IDispatch of Foo Service is not implemented in the example of FIG. 4. Client object 410 accesses the functionality of any of the services by QueryService'ing the IServiceProvider interface of server object 400 with pointer 412. As used herein, "QueryService'ing" or "QueryInterface'ing" means to make the respective function call on an interface. Communications to client object 410 are received at interface 414. A QueryService call which passes parameters for the Bar Service and the IBar interface using psuedocode as follows:

pointer→QueryService(SID_SBar, IID_IBar, pIBar)

results in a pointer to IBar interface 406 being returned to client object 410. A feature of the QueryService mechanism of the present invention is that once a client object has a pointer to an interface of a service, the client object can use the QueryInterface call to navigate to other member interfaces of the same service. QueryInterface calls in the service context are subject to the same object identity assumption as described above with respect to existing object control systems. However, one must be careful to use the QueryInterface call only for other interfaces that are part of the same service. In the above example, a pointer to IBar interface 406 is returned to client object 410. Client object 410 should not now QueryInterface IBar interface 406 for a pointer to IFoo interface 404 since IFoo interface 404 is not defined as part of the Bar Service. QueryInterface'ing for a pointer to an interface that is not part of the same service results in an undefined condition and is therefore illegal according to the methods of the present invention.

Another issue to address when implementing multiple services on a single object is the use of optional interfaces. In the example of FIG. 4, the optional interface IDispatch of Foo Service is not implemented. This is in accordance with the methods of the present invention in that implementation of an optional interface is optional. However, one must take care in adding additional services to server object 400 that include an IDispatch interface. For example, where another service (not shown) that implements IDispatch is added to server object 400, client object 410 could do the following:

pIServiceProvider→QueryService(SID_SFoo, IID_IFoo, pIFoo)

pIFoo→QueryInterface(IID_IDispatch, pIDispatch)

and receive a pointer to the wrong IDispatch. When implementing optional interfaces as part of a service, one must take care not to create a conflict by later adding services to the same object that utilize or provide for the same optional interfaces.

FIG. 5 illustrates an alternative implementation of the services defined in Table 2. The service implementations are separated from server object 500 on two additional service objects. Service object 510 implements the Foo Service and has IFoo interface 512. Service object 520 implements the Bar Service and the Bar2 Service and provides IBar interface 522 and IBar2 interface 524. Client object 530 uses pointer 532 to access the functionality of one of the services by QueryService'ing IServiceProvider interface 502 to get a pointer to an interface of a service. Communications to client object 530 are received at interface 534. The implementation of FIG. 5 appears no different than the implementation of FIG. 4 from the point of view of client object 530. In either case, client object 530 gets a pointer to the requested interface. Because object identity is not assumed, however, implementation can be broken into multiple objects to suit design requirements.

Implementing the Foo Service in a separate object, service object 510, solves the problem identified with the implementation of FIG. 4 involving the optional interface IDispatch. As long as no additional services are added to service object 510 there can be no conflict or errors due to another service implementing the optional interface.

Bar Service and Bar2 Service are both implemented on service object 520. This is possible since, as noted with respect to FIG. 4, although both services use the IBar interface, the IBar interface is used in the same way by both services. However, the QueryInterface problem noted with respect to FIG. 4 still exists with the implementation of FIG. 5. When client object 530 QueryService's IServiceProvider interface 502 for a pointer to the IBar interface of the Bar Service, a pointer is returned to an object having more interfaces than are part of the Bar Service. Client object 530 should not then QueryInterface IBar interface 522 to get a pointer to IBar2 interface 524 as IBar2 interface 524 is part of a different service.

FIG. 6 illustrates a further alternate implementation of the services defined in Table 2. Each of the three services is implemented on a separate object in the embodiment of FIG. 6. Client object 630 uses pointer 632 to QueryService the IServiceProvider interface 602 of server object 600. Communications to client object 630 are received at interface 633. According to the methods of the present invention, a pointer to the requested service interface is returned to client object 630 in response to the QueryService function call. Implementation 606 on object 600 is the implementation of the Foo Service which is accessed through IFoo interface 604. The Bar Service is implemented on service object 610 and has functionality accessed through IBar interface 612. The Bar2 Service is implemented on service object 620 and functionality accessed through IBar interface 622 and IBar2 interface 624. The same functionality is available at IBar interface 612 of the Bar Service and from IBar interface 622 of the Bar2 Service. The same interface having the same IID can be implemented on different objects because. as noted above with respect to FIGS. 2–3, each interface is accessed only after specifying the proper service in a QueryService function call.

The implementation of FIG. 6 ensures that client object 630 cannot QueryService to IBar interface 612 and then mistakenly QueryInterface for IBar2 interface 624 since the two services are implemented on different objects. FIGS. 2–6 demonstrate the advantages of the object interface control system of the present invention. FIGS. 2–6 also demonstrate the trade-offs between the risk of error conditions and design complexity that one should consider when implementing the object interface control system of the present invention.

Figure 7:
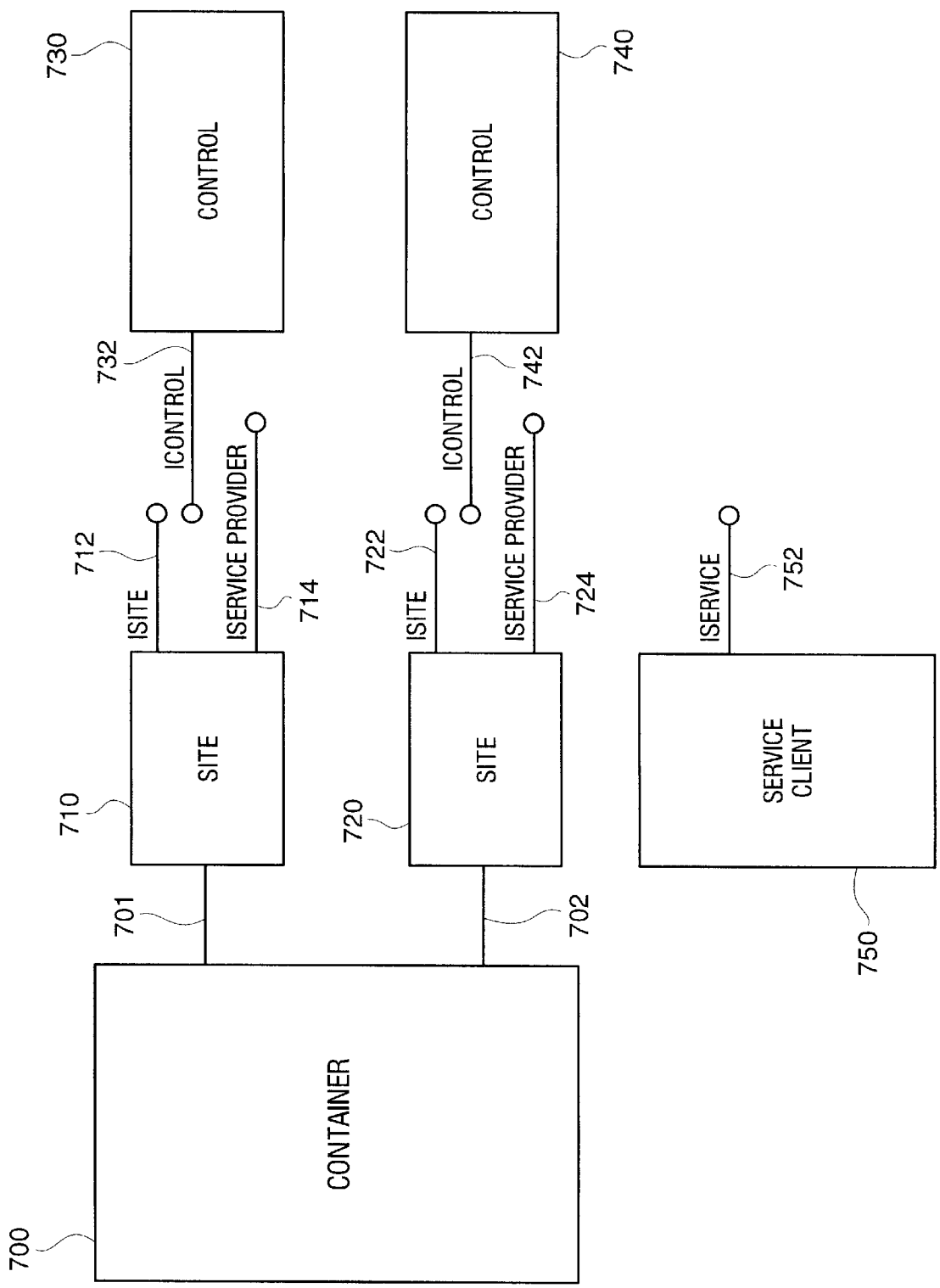
FIG. 7 is a block diagram illustrating an implementation of the inventive object interface control system utilizing sites.

Additional IServiceProvider Features—FIG. 7

The methods of the present invention described with respect to FIGS. 2–6 are not limited to the simple examples provided in FIGS. 2–6. Any object oriented environment and in particular any COM environment can take advantage of the interface control system of the present invention.

An example of a commonly used COM feature is site objects. FIG. 7 illustrates a COM container and controls utilizing COM sites. Container 700 implements site 710 and site 720. Communication between site 710 and container 700 and site 720 and container 700 are through private, possibly non-COM, means 701 and 702, respectively. Site 710 has ISite interface 712 and IServiceProvider interface 714. Site 720 has ISite interface 722 and IServiceProvider interface 724. Site 710 is associated with control 730 and site 720 is associated with control 740. The use of containers and sites is known to those skilled in the art of COM controls. Communications to control 730 are received at IControl interface 732 and communications to control 740 are received at IControl interface 742. FIG. 7 illustrates that the methods of the present invention are equally applicable to this application as they are to those described with respect to FIGS. 2–6. For example, control 740 can QueryService IServiceProvider interface 724 requesting a pointer to the IService interface 752 of service object 750. Service object 750 can contain multiple services or only a single service, as described above. The functionality of the service implemented on service object 750 could also be implemented on one of the site objects 710,720 or on container 700. All of the advantages described above with respect to FIGS. 2–6 as well as all of the rules of implementation apply equally to the application of the present invention illustrated in FIG. 7.

"Any Interface" Service Definition

It is noted above with respect to FIGS. 2–7 that once an interface pointer is obtained through a QueryService function call, a client object can QueryInterface to other interfaces which are part of the same service definition but cannot QueryInterface to other interfaces which are not part of the same service definition. There is an implementation of the present invention, for certain service definitions, which includes all possible interfaces as part of the service definition. Table 3 illustrates a service definition for a service named Parent Service.

TABLE 3

| Parent Service | SID_SParent | | Returns the logical "Parent" of a sited object. |
|---|---|---|---|
| | IID_IDispatch | Required | The programmability interface of the Parent object. |
| | Any interface | Optional | Any other interface implemented on the object on which the Parent Service is implemented |

The definition of Parent Service optionally includes any interface. This means that any other interface on the object on which Parent Service is implemented will be treated as an interface belonging to the Parent Service. In this case, one could, for example, QueryInterface from the IDispatch interface of the Parent Service to any other interface on the same object. One must be careful in designing the "any interface" feature into a service as its use can limit or eliminate the flexibility an implementor has in grouping multiple services on a single object.

Figure 8:
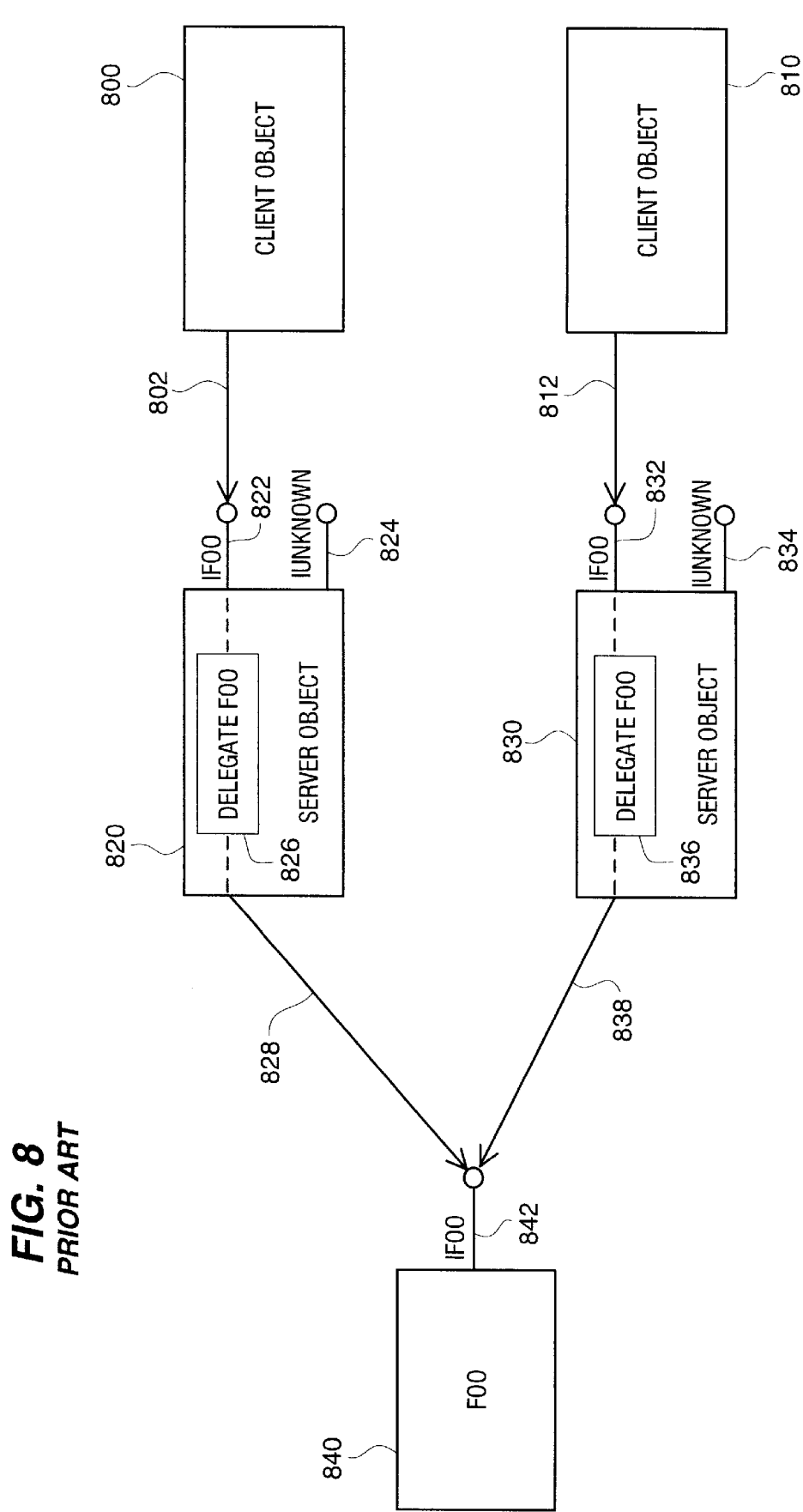
FIG. 8 is a block diagram illustrating delegation of a function call in the prior art.
Figure 9:
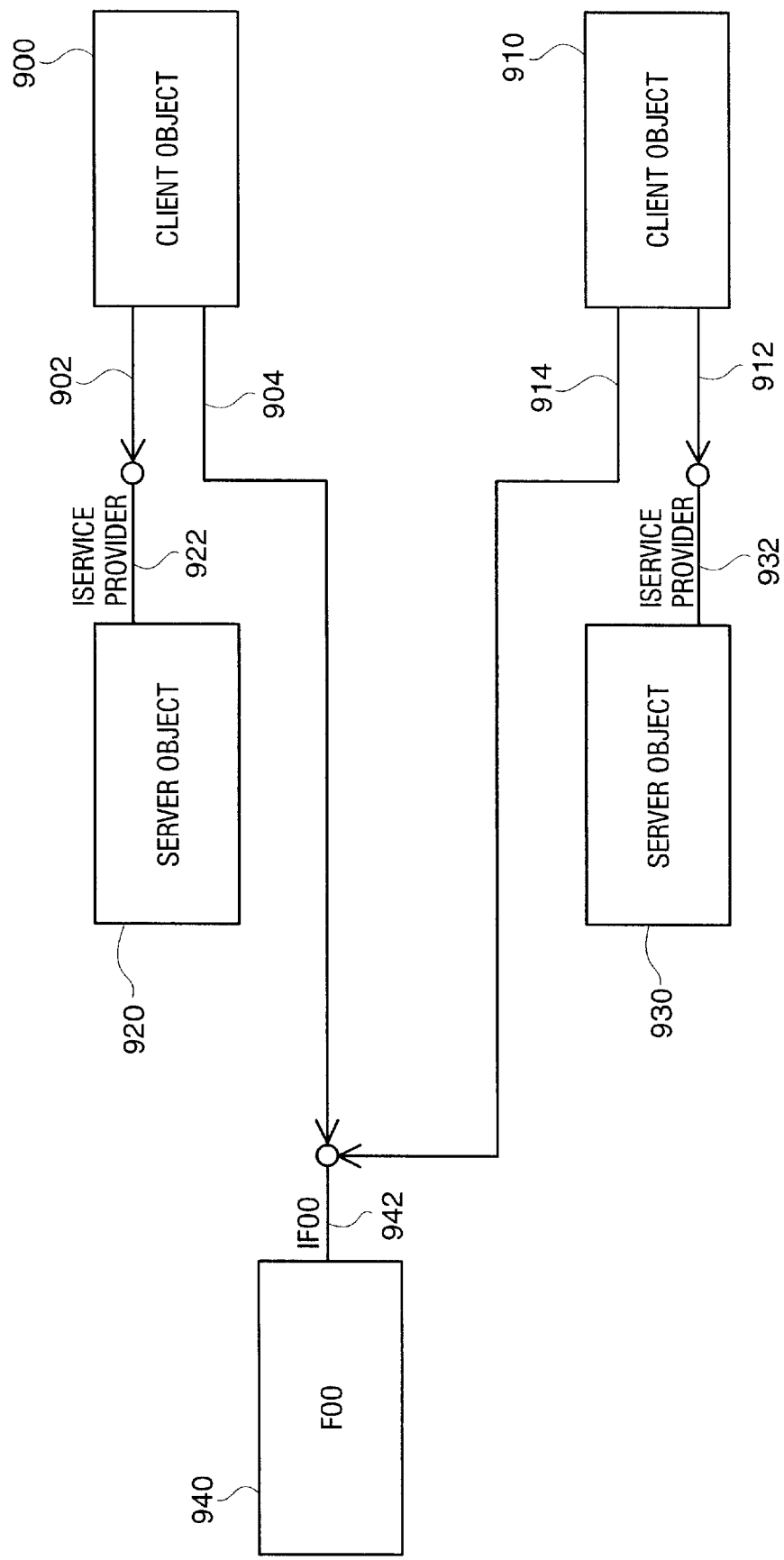
FIG. 9 is a block diagram illustrating delegation of a function call according to the method of the present invention when the delegating object knows of the requested service.
Figure 10:
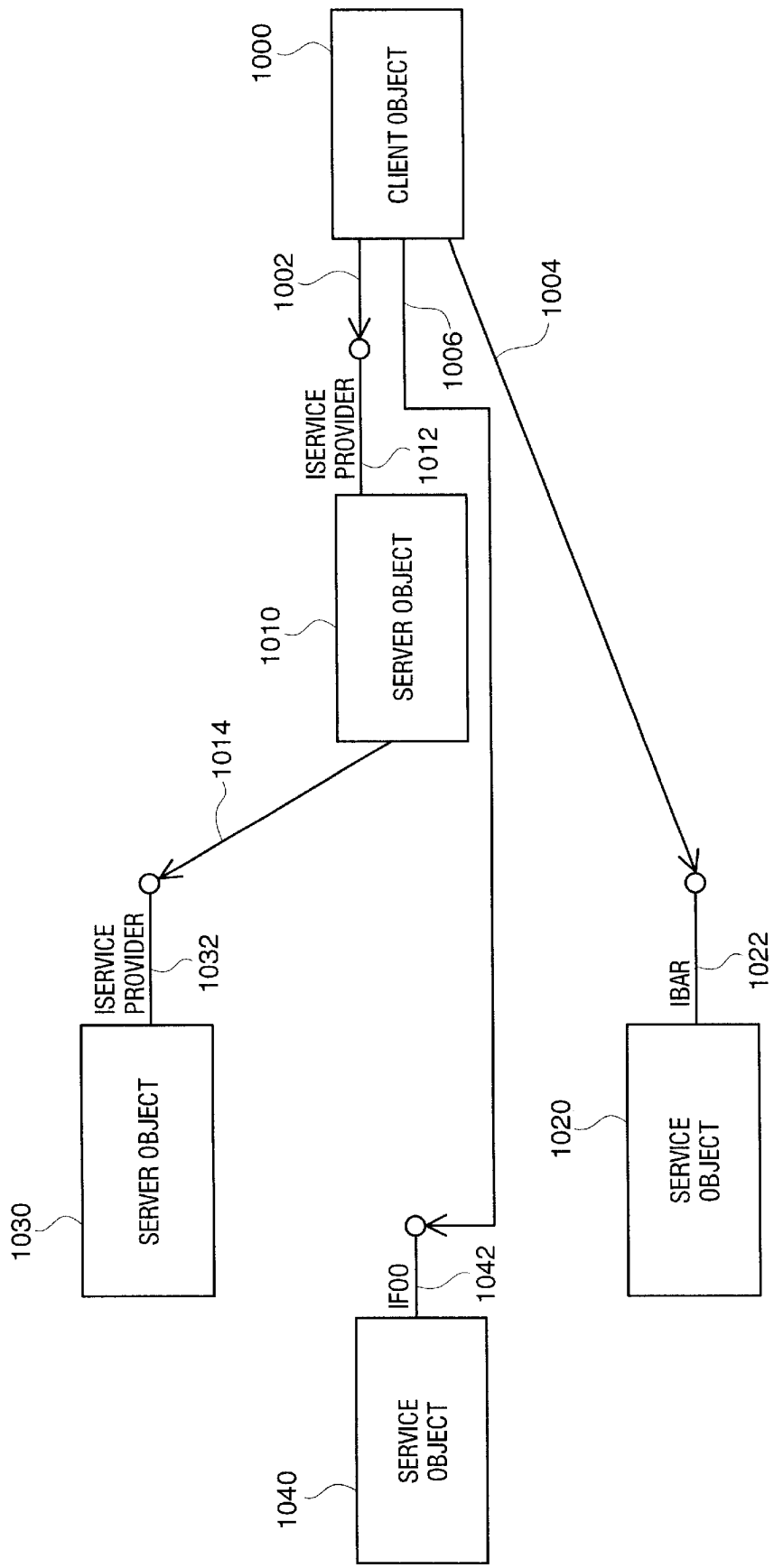
FIG. 10 is a block diagram illustrating delegation of a function call according to the method of the present invention when the delegating object does not know of the requested service.

Delegation of QueryService—FIGS. 8–10

A significant advantage of the present invention over existing systems is the ease with which the QueryService call is delegated. FIG. 8 illustrates the prior art approach to sharing common functionality Foo by client object 800 and client object 810. There are two choices for implementing a shared functionality. Server object 820 and server object 830 can both implement the Foo functionality internally or they can implement the Foo functionality by delegating each method of IFoo to a common object, Foo object 840, which actually implements the Foo functionality. FIG. 8 illustrates the latter option. Client object 800 accesses the Foo functionality by first QueryInterface'ing the IUnknown interface 824 to get pointer 802 to the IFoo interface 822 of server object 820. Likewise, client object 810 accesses the Foo functionality by first QueryInterface'ing the IUnknown interface 834 of server object 830. Each method of Foo invoked by client object 800 at IFoo interface 822 is delegated by the Delegate Foo function 826 of server object 820 to IFoo interface 842 of Foo object 840. The requested method of Foo is implemented at Foo object 840. Likewise, each method of Foo invoked by client object 810 at IFoo interface 832 is delegated by the Delegate Foo function 836 of server object 830 to IFoo interface 842 of Foo object 840. Each requested method of IFoo is delegated to Foo object 840. Any result of the operation of the requested Foo method is returned from Foo object 840 to the delegating server object 820 or 830 and finally to the requesting client object 800 or 810, respectively.

FIG. 9 illustrates the solution of the present invention to the delegation situation described with respect to the prior art and FIG. 8. Whereas existing systems delegate each method of the interface to be delegated, the present invention allows the request itself to be delegated. Client object 900 and client object 910 both utilize functionality Foo. Client object 900 makes a QueryService call on the IServiceProvider interface 922 of server object 920 requesting a pointer to the IFoo interface. Since QueryService is not constrained by object identity, a pointer to a different object can be returned to client object 900 by server object 920. Pointer 904 to the IFoo interface 942 of Foo function object 940 is returned from server object 920 to client object 900. Client object 900 then uses pointer 904 to call the methods available at the IFoo interface 942. Likewise, client object 910 makes a QueryService call on IServiceProvider interface 932 of server object 930 requesting a pointer to the IFoo interface. Pointer 914 is returned from server object 930 to client object 910. Client object 910 uses pointer 914 to call the methods available at the IFoo interface 942.

The delegation of the present invention is leveraged even further in that a server object can satisfy a request for a service without necessarily having knowledge about the requested service. FIG. 10 is used to illustrate this advantage of the present invention. Client object 1000 makes a QueryService call, using pointer 1002, on the IServiceProvider interface 1012 of server object 1010 for the Bar service. Server object 1010 knows of the Bar service and therefore returns pointer 1004 to client object 1000. Client object 1000 uses pointer 1004 to call the methods of the Bar service available at the IBar interface 1022 of service object 1020. Server object 1010 does, however, not know of the Foo service. Therefore, when client object 1000 QueryService's IServiceProvider interface 1012 of server object 1010 for the Foo service, server object 1010 is unable to directly supply a pointer for the Foo service back to client object 1000. Server object 1010 is itself a client of server object 1030. Server object 1010 QueryService's IServiceProvider interface 1032 of server object 1030. Server object 1030 knows of Foo service and returns pointer 1006 to client object 1000. Client object 1000 uses pointer 1006 to call the methods of Foo service at IFoo interface 1042 of service object 1040 A common application of this delegation method is where client object 1000 is one of a plurality of COM controls and server object 1010 is a COM site object for COM control that is client object 1000. In this example, server object 1014 is the container of the COM controls or the container of the container of the COM controls. This allows services not known to a layer of embedded objects (e.g. server object 1010) to still be exposed to the most-contained objects (e.g. client object 1000).

It is to be expressly understood that the claimed invention is not to be limited to the description of the preferred embodiment but encompasses other modifications and alterations within the scope and spirit of the inventive concept.

We claim:

1. In an object oriented programming environment, a method for a client object to obtain a pointer for accessing a functionality, said method comprising:

sending a request from said client object to a server object querying said server object to determine if a service object supports said functionality and a location of an interface by which to access said functionality, said request identifying said functionality separately from said interface at which said functionality is available;

receiving said request at said server object;

identifying the service object at which said functionality is available using said functionality and said interface identified in said request to identify;

generating said pointer to said interface in response to said identifying step wherein said interface is an element of said service object; and returning said pointer from said server object to said client object.

2. The method of claim 1 wherein said step of sending a request includes:

defining multiple services each having a unique service identifier and each including a respective service interface family from which is available a respective set of functionality;

selecting one of said multiple services whose said respective set of functionality includes said function;

selecting said interface from said service interface family corresponding to said selected service wherein said functionality is available from said interface;

forming said request from said selected service and said interface whereby said request uniquely identifies said functionality; and sending said request from said client object to said server object.

3. The method of claim 2 wherein said step of forming said request includes:

determining a service identifier which uniquely identifies said selected service;

determining an interface identifier which uniquely identifies said interface; and combining said service identifier and said interface identifier with a query to form said request.

4. The method of claim 2 wherein said step of defining multiple services includes:

defining a first service whose said respective service interface family defines a first set of functionality; and defining a second service whose said respective service interface family defines a second set of functionality, said second set of functionality having no functionality in common with said first set of functionality.

5. The method of claim 2 wherein said step of defining multiple services includes:

defining a first service whose said respective service interface family defines a first set of functionality; and defining a second service whose said respective service interface family defines a second set of functionality, said second set of functionality having functionality in common with said first set of functionality.

6. The method of claim 1 wherein said identifying step includes:

identifying a service object, in response to receipt of said request, at which said functionality is available wherein said service object is a different object than said server object.

7. The method of claim 1 wherein said identifying step includes:
   identifying a service object, in response to receipt of said request, at which said functionality is available wherein said service object is the same object as said server object.

8. The method of claim 2 wherein said identifying step includes:
   identifying a service object, in response to receipt of said request, at which said functionality is available wherein said service object contains said respective sets of functionality for said multiple services.

9. The method of claim 2 wherein said identifying step includes:
   parsing said request to identify said selected service and said interface wherein said selected service and said interface identify said functionality; and
   locating said service object at which said selected service is implemented.

10. The method of claim 9 wherein said step of generating a pointer includes:
    querying said service object for said pointer to said interface on said service object; and
    receiving said pointer at said server object from said service object wherein said pointer identifies said interface at which is available said functionality.

11. The method of claim 1 wherein said step of identifying said service object includes delegating said request from said server object to a second server object where said second server object identifies said service object.

12. The method of claim 11 wherein said second server object is a container object.

13. The method of claim 11 wherein said step of returning said pointer includes returning said pointer from said second server object to said client object.

14. A method for a client object to access a necessary functionality, said method comprising:
    identifying a service wherein said service is expressed as a set of functionality;
    requesting said functionality with a request from said client object to a server object querying said server object to determine if a service object supports said functionality and a location of an interface by which to access said functionality, said request identifies said functionality separately from said interface at which is available said set of functionality;
    receiving said request at said server object;
    generating a pointer to said interface using said functionality and said interface identified in said request to identify, wherein said interface is an element of said service object at which is implemented said service; and
    accessing said functionality with a call for said function from said client object to said service object using said pointer to said interface.

15. The method of claim 14 wherein said requesting step includes:
    selecting a service identifier which uniquely identifies said service;
    selecting an interface identifier which uniquely identifies said interface;
    combining said service identifier and said interface identifier in a query which requests access to said functionality; and
    sending said query from said client object to said service object.

16. The method of claim 15 wherein said step of generating a pointer includes:
    distinguishing, responsive to said receiving step, said service from among multiple services;
    distinguishing, responsive to said receiving step, said interface from among multiple interfaces, said multiple interfaces providing the means through which said set of functionality is expressed;
    locating a service object at which is implemented said set of functionality; and
    querying said service object for said pointer to said interface at which is available said functionality.

17. The method of claim 16 wherein said step of generating a pointer further includes:
    returning said pointer from said server object to said client object.

18. The method of claim 16 wherein said step of locating a service object includes:
    locating said service object where said service object is the same object as said server object.

19. The method of claim 16 wherein said step of locating a service object includes:
    locating said service object where said service object is a different object than said server object.

20. A computer-readable medium having computer-executable instructions for accessing a necessary function by a client object, said method steps comprising:
    identifying a service wherein said service is expressed as a set of functionality, and said set of functionality includes said necessary function;
    requesting said functionality with a request from said client object to a server object querying said server object to determine if a service object supports said functionality and a location of an interface by which to access said functionality, said request identifying said service and said interface at which is available said set of functionality;
    receiving said request at said server object;
    generating a pointer to said interface using said service and said interface identified in said request to identify, wherein said interface is an element of said service object at which is implemented said service; and
    accessing said functionality with a call for said function from said client object to said service object using said pointer to said interface.

21. The computer-readable medium of claim 20 wherein said requesting step includes:
    selecting a service identifier which uniquely identifies said service;
    selecting an interface identifier which uniquely identifies said interface;
    combining said service identifier and said interface identifier in a query which requests access to said function; and
    sending said query from said client object to said service object.

22. The computer-readable medium of claim 21 wherein said step of generating a pointer includes:
    distinguishing, responsive to said receiving step, said service from among multiple services;
    distinguishing, responsive to said receiving step, said interface from among multiple interfaces, said multiple interfaces providing the means through which said set of functionality is expressed;
    locating a service object at which is implemented said set of functionality; and querying said service object for said pointer to said interface at which is available said function.

23. The computer-readable medium of claim 22 wherein said step of generating a pointer further includes:

returning said pointer from said server object to said client object.

24. The computer-readable medium of claim 22 wherein said step of locating a service object includes:

locating said service object where said service object is the same object as said server object.

25. The computer-readable medium of claim 22 wherein said step of locating a service object includes:

locating said service object where said service object is a different object than said server object.

* * * * *